US011991934B1

(12) United States Patent
Jeffrey et al.

(10) Patent No.: US 11,991,934 B1
(45) Date of Patent: *May 21, 2024

(54) QUANTUM PROCESSOR DESIGN TO INCREASE CONTROL FOOTPRINT

(71) Applicant: Google LLC, Mountain View, CA (US)

(72) Inventors: Evan Jeffrey, Santa Barbara, CA (US); Julian Shaw Kelly, Santa Barbara, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/088,144

(22) Filed: Dec. 23, 2022

Related U.S. Application Data

(63) Continuation of application No. 16/933,513, filed on Jul. 20, 2020, now Pat. No. 11,538,976, which is a (Continued)

(51) Int. Cl.
H01L 23/00 (2006.01)
B82Y 10/00 (2011.01)
G06F 30/392 (2020.01)
G06N 10/00 (2022.01)
H10N 60/81 (2023.01)
H10N 69/00 (2023.01)

(52) U.S. Cl.
CPC ............ H10N 60/815 (2023.02); B82Y 10/00 (2013.01); G06F 30/392 (2020.01); G06N 10/00 (2019.01); H01L 24/16 (2013.01); H01L 24/17 (2013.01); H10N 69/00 (2023.02); H01L 2224/14179 (2013.01); H01L 2224/16148 (2013.01); H01L 2224/17179 (2013.01)

(58) Field of Classification Search
CPC ...... H10N 60/815; H10N 69/00; B82Y 10/00; G06F 30/392; G06N 10/00; H01L 24/17; H01L 2224/14179; H01L 2224/16148; H01L 2224/17179
See application file for complete search history.

(56) References Cited

U.S. PATENT DOCUMENTS 6,614,047 B2    9/2003  Tzalenchuk
7,533,068 B2    5/2009  Maassen van den Brink
(Continued)

OTHER PUBLICATIONS

Kandala et al., "Hardware-efficient variational quantum eigensolver for small molecules and quantum magnets," arXiv 1704/05018v2, Oct. 13, 2017, 24 pages.
(Continued)

Primary Examiner — Eugene Lee
(74) Attorney, Agent, or Firm — Fish & Richardson P.C.

(57) ABSTRACT

A quantum processor includes: a first chip comprising a qubit array, in which a plurality of qubits within the qubit array define an enclosed region on the first chip, in which each qubit of the plurality of qubits that define the enclosed region is arranged to directly electromagnetically couple to an adjacent qubit of the plurality of qubits that define the enclosed region, and in which each qubit of the qubit array comprises at least two superconductor islands, and a second chip bonded to the first chip, the second chip including one or more qubit control elements, in which the qubit control elements are positioned directly over the enclosed region of the first chip.

20 Claims, 4 Drawing Sheets

Related U.S. Application Data continuation of application No. 16/247,377, filed on Jan. 14, 2019, now Pat. No. 10,720,563.

(60) Provisional application No. 62/760,485, filed on Nov. 13, 2018.

(56) References Cited

U.S. PATENT DOCUMENTS

| | | | |
|---|---|---|---|
| 7,624,088 B2 * | 11/2009 | Johnson | G06N 10/00 |
| | | | 706/62 |
| 9,455,391 B1 | 9/2016 | Nayfeh | |
| 10,134,972 B2 | 11/2018 | Oliver | |
| 10,229,366 B2 * | 3/2019 | Gambetta | G06N 20/00 |
| 10,243,132 B1 | 3/2019 | Rosenblatt | |
| 10,263,170 B1 | 4/2019 | Brink | |
| 10,311,369 B2 * | 6/2019 | Epstein | G06N 10/00 |
| 10,573,685 B1 | 2/2020 | Adiga | |
| 10,586,911 B1 | 3/2020 | Sandberg | |
| 10,672,971 B2 | 6/2020 | Brink et al. | |
| 10,720,563 B1 | 7/2020 | Jeffrey et al. | |
| 10,998,486 B1 | 5/2021 | Martinis | |
| 2005/0082519 A1 | 4/2005 | Amin | |
| 2007/0174227 A1 | 7/2007 | Johnson | |
| 2016/0335558 A1 | 11/2016 | Bunyk | |
| 2017/0091649 A1 | 3/2017 | Clarke | |
| 2017/0141287 A1 | 5/2017 | Barkeshli | |
| 2017/0337155 A1 * | 11/2017 | Novotny | G06F 30/394 |
| 2018/0069288 A1 | 3/2018 | Minev | |
| 2019/0042964 A1 | 2/2019 | Elsherbin | |
| 2019/0043822 A1 | 2/2019 | Falcon | |
| 2019/0044046 A1 | 2/2019 | Caudillo | |
| 2019/0044047 A1 | 2/2019 | Elsherbini | |
| 2019/0044668 A1 | 2/2019 | Elsherbini | |
| 2019/0165244 A1 * | 5/2019 | Hertzberg | H10N 60/0912 |
| 2019/0220771 A1 * | 7/2019 | Boothby | G06N 10/00 |
| 2019/0363128 A1 | 11/2019 | Rosenblatt | |
| 2019/0385673 A1 | 12/2019 | Bosman | |
| 2020/0035902 A1 * | 1/2020 | Olivadese | H10N 60/815 |
| 2020/0043977 A1 | 2/2020 | Adiga | |
| 2020/0058702 A1 * | 2/2020 | Kelly | H10N 69/00 |
| 2020/0075833 A1 | 3/2020 | Clarke | |
| 2020/0395405 A1 * | 12/2020 | Barends | H01P 3/003 |

OTHER PUBLICATIONS

Versluis et al., "Scalable quantum circuit and control for a superconducting surface code," arXiv 1612.08208v1, Dec. 24, 2016, 9 pages.

* cited by examiner

QUANTUM PROCESSOR DESIGN TO INCREASE CONTROL FOOTPRINT

CROSS REFERENCE TO RELATED APPLICATIONS

This patent application is a continuation (and claims the benefit of priority under 35 USC 120) of U.S. patent application Ser. No. 16/933,513, filed on Jul. 20, 2020, which is a continuation of U.S. patent application Ser. No. 16/247,377, filed Jan. 14, 2019, which claims the benefit of U.S. Provisional Patent Application No. 62/760,485, filed Nov. 13, 2018, the disclosures of which are hereby incorporated by reference in their entirety.

TECHNICAL FIELD

The present disclosure relates to quantum processor design, and more particularly the design and arrangement of qubits in a quantum processor for increasing the number of qubits in a quantum processor.

BACKGROUND

Large-scale quantum computers have the potential to provide fast solutions to certain classes of difficult problems. Multiple challenges in the design and implementation of quantum architecture to control, program and maintain quantum hardware impede the realization of large-scale quantum computing.

SUMMARY

The present disclosure describes technologies for designing qubits that are organized in a qubit array structure included in a quantum processor.

In general, in some aspects, the subject matter of the present disclosure may be embodied in devices that include: a first chip including a qubit array, in which multiple qubits within the qubit array define an enclosed region on the first chip, in which each qubit of the multiple qubits that define the enclosed region is arranged to directly electromagnetically couple to an adjacent qubit of the multiple qubits that define the enclosed region, and in which each qubit of the qubit array includes at least two superconductor islands; and a second chip bonded to the first chip, the second chip including at least one control element, in which the at least one control element is positioned directly over the enclosed region of the first chip.

The foregoing and other implementations can each optionally include one or more of the following features, alone or in combination. For example, in some implementations, the qubit array includes multiple rows of qubits and multiple columns of qubits.

In some implementations, the enclosed region on the first chip is unoccupied by qubits, control elements, and wiring.

In some implementations, the enclosed region includes an exposed surface of a substrate. The substrate may include silicon or sapphire.

In some implementations, for each qubit of the plurality of qubits, an entirety of a space separating the qubit from an adjacent qubit of the plurality of qubits is free of an intermediate coupling element.

In some implementations, each qubit of the qubit array includes at least three superconductor islands. For each qubit, a first superconductor island of the qubit may be electrically insulated from a second adjacent superconductor island of the qubit.

In some implementations, for each qubit of the qubit array, a first superconductor island of the qubit is coupled to a second superconductor island by a Josephson junction.

In some implementations, there is a separation gap between the first chip and the second chip.

In some implementations, the at least one control element includes a qubit XY control element or a qubit Z control element.

In some implementations, the multiple qubits include four qubits arranged in two adjacent rows and two adjacent columns of the qubit array.

In some implementations, the at least one control element is on a surface of the second chip that faces a surface of the first chip on which the qubit array is arranged.

In some implementations, each of the at least two superconductor islands have the same size.

In some implementations, at least two of the at least two superconductor islands have a different size.

In some implementations, each qubit may be coupled capacitively to the adjacent qubit. A degree of capacitive coupling may be determined substantially by a space separating the qubit from an adjacent qubit.

In some implementations, a resonance frequency of each qubit is determined by a Josephson junction critical current of each qubit, in which each qubit is arranged such that the capacitance of each qubit is determined by an area of the superconductor islands and a number of the superconductor islands of each qubit and such that the capacitance of each qubit increases with the area and decreases with the number of superconductor islands. The areas of the superconductor islands of respective qubits may be substantially the same and the number of superconductor islands of respective qubits may be the same, and with predetermined resonance frequencies of the multiple qubits, an area of the enclosed region between two or more of the multiple qubits is determined by the area and the number of the superconductor islands of each qubit.

In some implementations, each qubit is defined by the at least two superconductor islands disposed within a cutout within a superconductor plane, and the superconductor islands are electrically insulated from the superconductor plane. The superconductor plane may or may not be an electrical ground. The cutout may be cross-shaped.

The subject matter described in this specification can be implemented in particular ways so as to realize one or more of the following advantages.

The realization of large-scale quantum computers requires quantum processors that include large numbers of high quality qubits and corresponding control elements that allow for the control of those qubits, e.g., to measure the qubits or to perform gate operations. Qubits in a quantum processor may be arranged in a qubit array and in such a way that adjacent qubits couple directly to each other. Increasing the number of qubits may also increase the number of control elements required for each of the multiple qubits, for example the number of control lines or wires. Further, to improve the quality of each of the multiple qubits, for example improving a relaxation time or error rate such that it exceeds a predetermined value, e.g., a value based on a maximal qubit error rate that achieves fault tolerant quantum computations, may require additional control elements. The present disclosure is directed towards a qubit design in which the control footprint area on a quantum processor that includes qubits arranged in a qubit array with adjacent qubits directly coupled to each other may be increased.

The increased control foot print may provide additional space in the quantum processor for existing control elements and for the introduction of new control elements such that interference of the control elements with each of the multiple qubits may be reduced or eliminated. In addition, number of qubits in the quantum processor may be increased and the quality of the qubits in the quantum processor may be improved.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
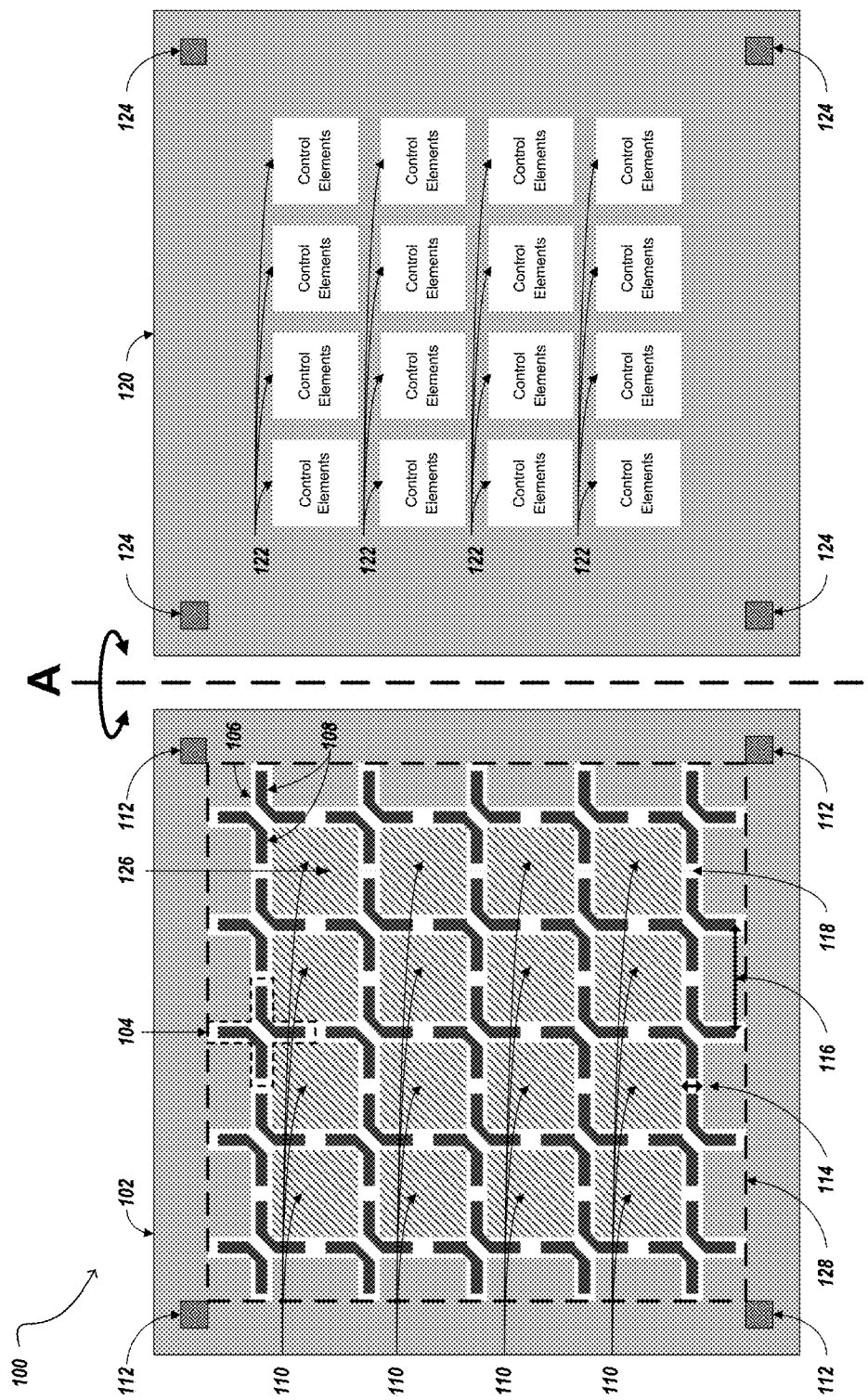
FIG. 1A is a schematic that illustrates an example of a quantum processor designed for an increased control footprint area.

The present disclosure relates to an improved quantum processor design. In particular, this disclosure describes a quantum processor with an increased control footprint area.

One potential quantum processor design includes bonding two chips together to form the quantum processor. A first chip may include a qubit array that includes multiple qubits and a second chip may include control elements. There is a separation gap between the first chip and the second chip when they are bonded to each other.

For example, the two chips may be bonded to each other such that a surface of a first substrate on which the qubits are positioned and a surface of a second substrate on which the control elements are positioned face each other. When bonded together the control elements may be positioned such that they are not directly above a region on the first chip in which a qubit included in the qubit array is positioned and therefore interference of the control elements with each of the multiple qubits may be reduced or eliminated which otherwise may increase or cause qubit errors due to transitions or leakage into qubit states outside the computational subspace.

One approach for increasing the control footprint for such a design may be to introduce coupling resonators or buses between adjacent qubits included in a qubit array to increase a distance between adjacent qubits. This increases the area of the region on the first chip that is enclosed by qubits and is free of qubits. This area may define the control footprint. In this approach the qubits couple indirectly to each other through the additional resonators or buses which may lead to additional losses or qubit errors.

The present disclosure covers designs for increasing the control footprint in a quantum processor that includes directly coupled qubits within a qubit array. Target qubit specifications such as relaxation time, resonance frequency or error rate may have a particular (total or effective) capacitance value for a qubit associated with it. By separating or changing the dimensions of specific elements of each of the qubits, for example by separating a single superconductor element of the qubit into two or more superconductor islands, a qubit capacitance may be reduced when the qubit dimensions are held fixed. For example, specific elements, such as a superconductor arm, of a qubit may be divided into multiple separate/isolated islands, corresponding to multiple capacitors in series that determine a total or effective capacitance of each of the qubits. To achieve the target qubit specifications, the dimensions of the qubit with the isolated elements (e.g., the superconductor islands) may be changed which changes the effective capacitance of the qubit. In particular, the distance between adjacent qubits may be increased to achieve the same total capacitance for each of the qubits as the total capacitance for each of the qubits without separating or changing the dimensions of the specific elements.

Increasing the distance between adjacent qubits increases the control footprint. For example, a control footprint area on the first chip may be a region that is enclosed by four qubits in the qubit array on the first chip, e.g., four qubits that may be arranged in two adjacent rows and two adjacent columns of the array. The example control footprint area may be increased by separating specific elements of each of the four qubits, e.g. separating a superconductor island into two or more superconductor islands, and increasing the distance between each of the four qubits and a corresponding adjacent qubit to a value at which the total or effective capacitance of each of the four qubits has a value corresponding to the target qubit specification.

FIG. 1A is a schematic that illustrates an example of a quantum processor 100 designed for an increased control footprint area 110. Quantum processor 100 includes a first chip 102 and a second chip 120.

First chip 102 includes a qubit array 128. The qubit array 128 may include multiple qubits, e.g., qubit 104, arranged in multiple rows and columns. In the example of FIG. 1A the qubit array 128 includes 25 qubits, however the number of qubits included in the qubit array 128 may be lower than 25 or higher than 25. The qubits included in the qubit array 128 may be superconducting qubits, e.g., transmon qubits. The qubits shown in the example of FIG. 1A include two superconductor islands 108 positioned on a second material 106, however, the qubits may also include more than two superconductor islands. The two superconductor islands 108 may be coupled to each other by a Josephson junction (not shown). Each of the qubits may be defined by the two or more superconductor islands that are disposed within a cutout within a superconductor plane where the superconductor islands may be electrically insulated from the superconductor plane and the superconductor plane is part of the first chip. The superconductor island may or may not act as an electrical ground. The cutout may be cross-shaped.

Qubits in the example of FIG. 1A have a differential design and have a cross-like or cross shape. However, in other examples different designs and shapes may be used, e.g., the positioning, arrangement, shape, size or number of superconductor islands may be different. For example, the qubits may include 3, 4, 5, or 6 superconductor islands. In some examples the at least two superconductor islands, e.g. superconductor islands 108, may have the same size. In other examples at least two of the at least two superconductor islands, e.g. superconductor islands 108, may have a different size. Further, the two superconductor islands 108 may be made of superconductor material, such as aluminum or titanium nitride, whereas the second material 106 may be a high quality dielectric, such as silicon or sapphire.

The qubits included in the qubit array 128 define multiple enclosed regions, e.g., enclosed region 110, on the first chip 102. The enclosed regions may be unoccupied by qubits, control elements, and wiring. The enclosed regions are considered control footprint areas.

In the example of FIG. 1A each enclosed region is defined by four qubits arranged in two adjacent rows and two adjacent columns of the qubit array. The shape of the enclosed regions in the example of FIG. 1A are approximately squares. Other shapes of the enclosed regions are possible and the chosen shape is dependent on the qubit array 128 design and the design of the qubits defining the enclosed regions. Further, the enclosed regions may include an exposed surface of a substrate. For example, the substrate may be the material the first chip 102 is substantially made of or the substrate may be a coating on or a top layer of the first chip 102. For example, the substrate may include silicon or sapphire.

Each of the qubits included in the qubit array 128 may be arranged to directly couple to respective adjacent qubits. In particular, each of the qubits may be arranged to directly electromagnetically couple to respective adjacent qubits. For example, a qubit may couple capacitively to an adjacent qubit. A qubit may directly electromagnetically couple to an adjacent qubit through a first superconductor island included in the qubit and a second superconductor island included in the adjacent qubit. The first superconductor island and the second superconductor island may be spaced apart by a gap, e.g., gap 118, from each other. The entirety of a space separating each qubit 104 from an adjacent qubit 104, e.g., a space that includes the gap, may be free of an intermediate coupling element. The first superconductor island may be electrically insulated from the second adjacent superconductor island. A degree of capacitive coupling between each of the qubits and respective adjacent qubits included in the qubit array 128 may be determined substantially by the space separating each qubit 104 from an adjacent qubit 104.

A resonance frequency of each of the qubits may be determined by a respective (total or effective) capacitance of each qubit. Further, each of the qubits may be arranged such that the capacitance of each of the quits is effectively determined by an area of the superconductor islands and a number of the superconductor islands of each of the qubits. For qubits having superconductor island thickness in the thin film limit (e.g., for qubits having a film thickness of about 100 nm or less, which is much smaller than the qubit geometric feature sizes of about 10 microns), the contribution of the thickness to capacitance may be ignored. For example, each of the qubits may be arranged such that the capacitance of each of the qubits increases with the area and decreases with the number of superconductor islands.

The areas of the superconductor islands of each of the qubits in qubit array 128 may be substantially the same and the number of superconductor islands of each of the qubits in qubit array 128 may be the same. For predetermined resonance frequencies of each of the qubits in the qubit array 128 an area or the size of an area of each of the enclosed regions, e.g. enclosed regions 110, between two or more of the multiple qubits may be determined by the area and the number of superconductor islands of each of the qubits.

The first chip 102 may also include bonding elements 112 for bonding the first chip 102 to the second chip 120. The position and number of bonding elements in FIG. 1A is an example. First chip 102 may include fewer or more bonding elements 112 and bonding elements 112 may be positioned differently than those shown in FIG. 1A. In some implementations the bonding elements 112 may include bump bonds.

The second chip 120 includes control elements 122. Control elements 122 may include control lines or wiring, qubit XY control, and qubit Z control. The second chip 120 may include bonding elements 124 for bonding the second chip 120 to the first chip 102.

The first chip 102 and the second chip 120 may be bonded to each other such that a surface of the second chip 120 (on which the control elements are arranged) faces a surface of the first chip 102 (on which the qubit array 128 is arranged.) Axis A of FIG. 1A and the associated arrow serve as a visual guide for how to bond the first chip 102 and the second chip 120 to form quantum processor 100.

Control elements 122 may be positioned directly over respective enclosed regions when the second chip 120 is bonded to the first chip 102. For example, control elements 122 may be positioned directly over enclosed region 110 when the second chip 120 is bonded to the first chip 102. When the second chip 120 is bonded to the first chip 102, the control elements 122 may not cover an area larger than the area of the enclosed regions 110.

When the first chip 102 and the second chip 120 are bonded to each other there may be a separation gap between the first chip 102 and the second chip 120. Further, there may be a gap between qubits and enclosed regions 110 on the first chip and control elements 122 on the second chip. The gap between qubits and enclosed regions 110 on the first chip and control elements 122 on the second chip may be defined by the bonding elements 112 on the first chip and the bonding elements 124 on the second chip. For further details on the positioning and arrangement of qubits, enclosed regions, and control elements see FIG. 1B below.

The size of the area $A_c$ of an enclosed region of FIG. 1A is defined by the qubit width $W_q$ 114 and the qubit pitch $P_q$ 116 and can be expressed as $$A_c = (P_q - W_q)^2 \qquad (1)$$

Increasing the size of the area $A_c$ can be achieved by reducing the qubit width $W_q$ 114 of a respective qubit or the qubit pitch $P_q$ 116 of the respective qubit. However, changing the qubit width $W_q$ 114 and the qubit pitch $P_q$ 116 changes the (total or effective) capacitance of the qubit. For example, changing the qubit pitch $P_q$ 116 may change the capacitance linearly. The total capacitance of each of the qubits included in the qubit array 128 is a quantity that should be preserved when increasing the size of the area $A_c$ of each enclosed region 110. This is because the total capacitance may be associated with target qubit specifications of qubits included in the qubit array 128, e.g., an error rate, relaxation time, resonance frequency or the direct coupling between adjacent qubits.

Increasing, for example, the qubit pitch $P_q$ 116 and thereby the size of the area $A_c$ while preserving the total capacitance may be achieved by increasing the number of superconductor islands used to form each qubit. For example, by increasing the number of superconductor islands for each qubit from one to two or more (of a same total size and shape), the size of the area $A_c$ can be increased by a factor of approximately 16 using the design of FIG. 1A instead of a design with a single superconductor island.

Using different designs than that shown in FIG. 1A, the size of the area $A_c$ can be increased by factors other than 16. In particular, the size of the area $A_c$ can be increased by factors larger than 16 compared to a design with a single superconductor island. Further details on the qubit design shown in FIG. 1A is given with reference to FIG. 2A below. Another example of a qubit design is described with reference to FIG. 2B below.

The design of example quantum processor 100 and of directly electromagnetically coupled qubits, e.g., qubit 104, allows for an increased size of the area $A_c$ of enclosed regions 110 compared to quantum processors that include a qubit array of directly coupled qubits that do not have at least two superconductor islands 108 while having the same target qubit specifications that may be relevant for performing a quantum computation.

Figure 1B:
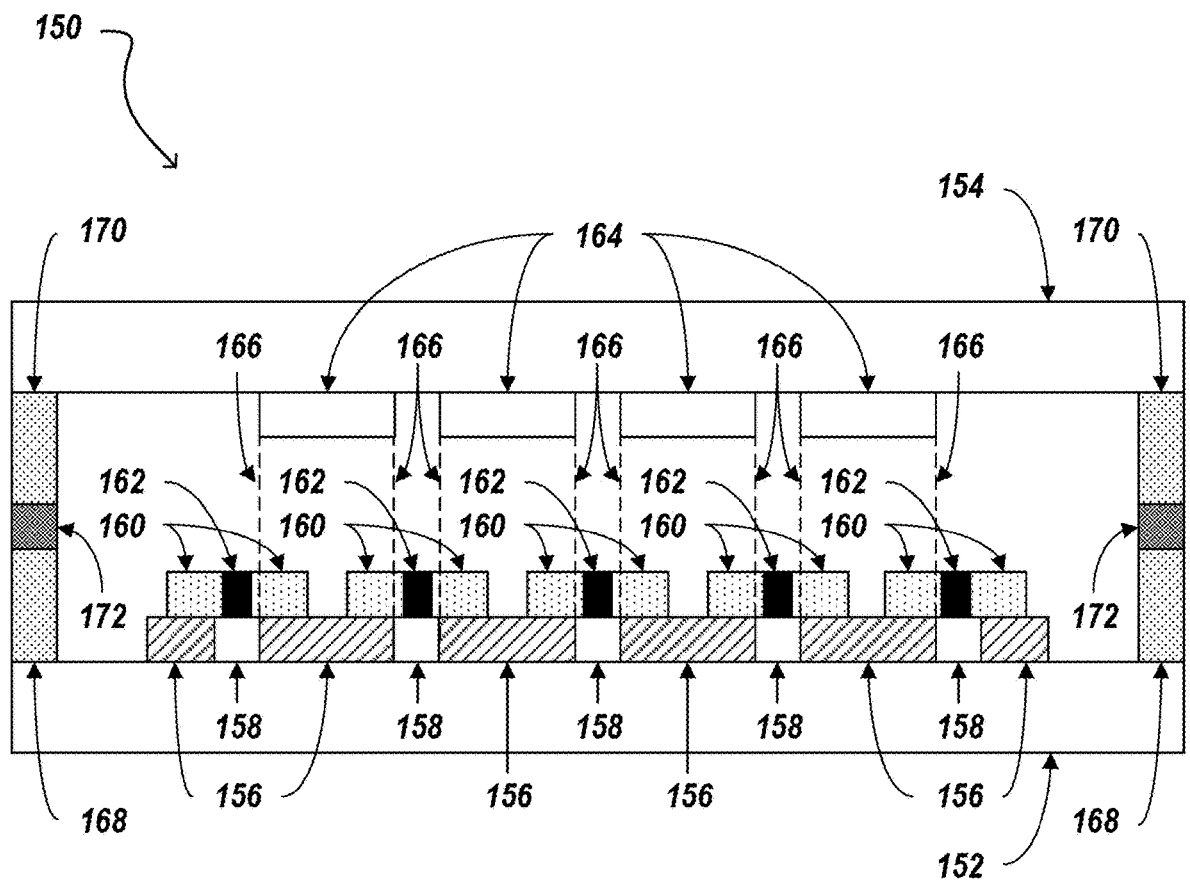
FIG. 1B is a cross section of an example quantum processor that illustrates an arrangement of two chips with a qubit design for an increased control footprint area.

FIG. 1B is a side-view of an example quantum processor 150 that illustrates an arrangement of two chips with a qubit design for an increased control footprint area. FIG. 1B may illustrate the arrangement of the first chip 102 and the second chip 120 of FIG. 1A including the positioning of qubits 104, enclosed regions 110, and control elements 122 relative to each other when the second chip 120 is bonded to the first chip 102 to form quantum processor 100 of FIG. 1A.

Quantum processor 150 includes a first chip 152 and a second chip 154 that may correspond to the first chip 102 and the second chip 120, respectively, of FIG. 1A. The first chip 152 and the second chip 154 are bonded together through bonding elements 168 and 170, e.g. bonding elements 112 and 124, respectively, of FIG. 1A. Bonding elements 168 and 170 may be directly bonded to each other or bonded through an additional bonding material 172 as shown in FIG. 1B. The second chip 154 is bonded to the first chip 152 such that a surface of the second chip 154 (that includes control elements 164) faces a surface of the first chip 152 (on which a qubit array is arranged, e.g. qubit array 128 of FIG. 1A including qubits 104.) The side view of the first chip 152 shows 5 example qubits, i.e., corresponding to one row of the qubit array 128 of FIG. 1A. The side view shows a side of two superconductor islands of each qubit. The black elements 162 may correspond to the surface of an end of one of the two superconducting islands included in a respective qubit. The element 160 with a dotted pattern may correspond to the surface of a side of a perpendicular part of the two superconducting islands included in the respective qubit. The superconducting islands are formed on the dielectric substrate 156 of the chip 152.

The side view of the second chip 154 shows a side of control elements 164, e.g. control elements 122 of FIG. 1A. Control elements 164 are positioned directly over enclosed regions, e.g. enclosed regions 110 of FIG. 1A. Although control elements 164 are shown directly over the superconductor arms of the qubits on the first chip 152 in FIG. 1B, in actuality the position of control elements 164 is set back into the page, such that they are directly over the enclosed regions, in which the qubits are not formed. The left side and the right side of the border of the enclosed region on the first chip, defined by the qubits, and the border's position relative to the control elements 122 is indicated by dashed lines 166. Control elements 164 are shown to be positioned within the borders of the enclosed region, e.g. enclosed region 110 of FIG. 1A.

Figure 2A:
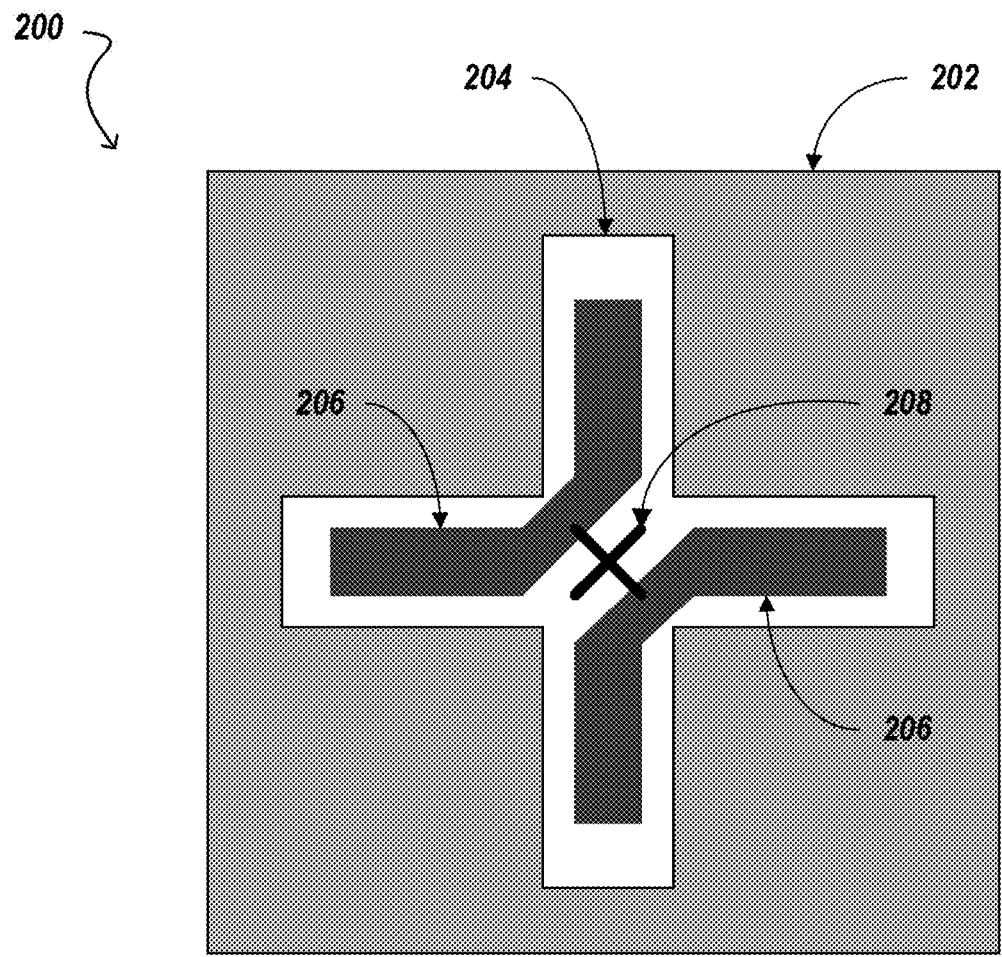
FIG. 2A shows two schematics that illustrate an example qubit design with two superconductor islands for an increased control footprint area.
Figure 2A:
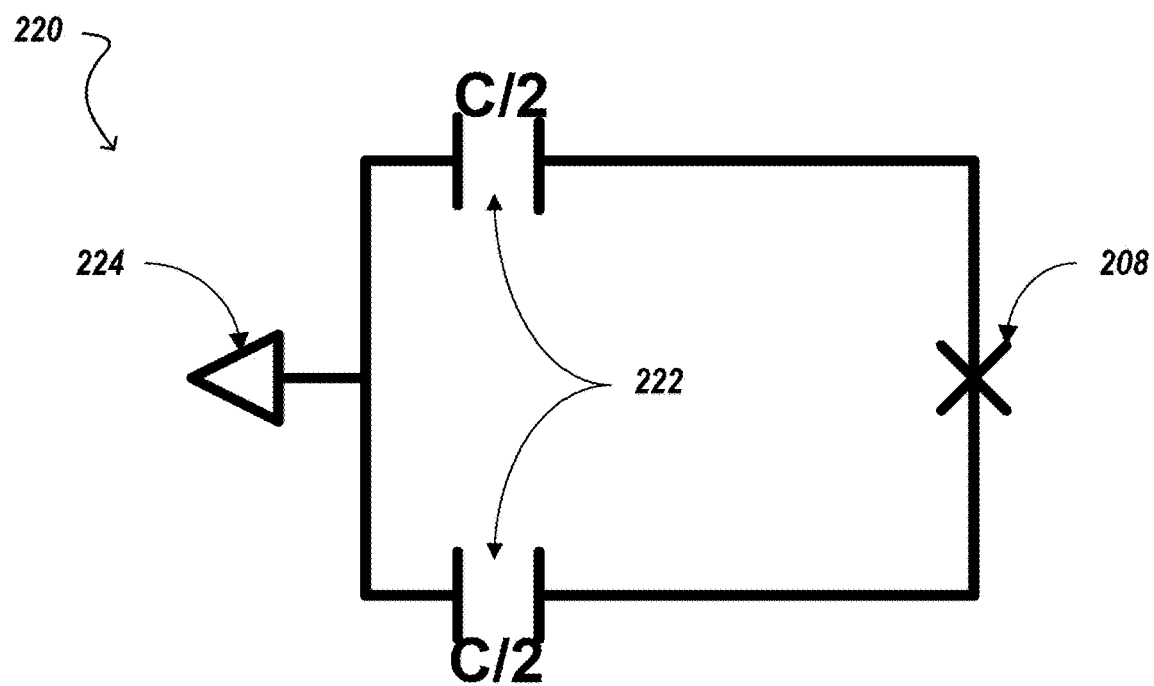

FIG. 2A shows two schematics 200, 220 that illustrate an example qubit design with two superconductor islands 206 for an increased control footprint area. Schematic 200 is a top view of an example of a qubit formed on a substrate that may be part of a chip, e.g. first chip 102 of FIG. 1A. Two superconductor islands 206 are coupled together by a Josephson junction 208 to form a qubit, e.g. qubit 104 of FIG. 1A. The qubit shown in FIG. 2A may be included in a qubit array such as qubit array 128 of FIG. 1A. The qubit shown in FIG. 2A is surrounded by a superconductor ground plane 202.

The superconductor islands may be separated from the ground plane 202 by a gap 204 shown in white in FIG. 2A. The gap may correspond to regions where superconductor material has been removed to expose a portion of the substrate on which the qubit is formed.

Schematic 220 is a circuit diagram corresponding to the exemplary qubit design shown in schematic 200. The circuit diagram includes Josephson junction 208, a short 224 to ground, and two capacitors 224. Each of the capacitors 224 corresponds to a capacitor formed by each of the two superconducting islands 206. Each of the capacitors 224 has capacitance C/2 where C represents the capacitance for a qubit design with one superconductor island of the same shape and size as the two superconductor islands 206. The single superconductor island qubit design includes only one capacitor formed by the single superconductor island. The total or effective capacitance of the qubit design may be C. The total capacitance of the circuit corresponding to the two superconductor island qubit design shown in FIG. 2A is C/4 because capacitors 224 are in series via Josephson junction 208. To achieve the same total or effective capacitance as that of the single superconductor island qubit design, the length of each of the two superconductor islands 206 may be increased by a factor of approximately 4. Using a qubit design such as the one shown in FIG. 2A to form a qubit array such as qubit array 128 shown with respect to FIG. 1A allows to increase the qubit pitch $P_q$ 116 of FIG. 1A by a factor of 4 whilst obtaining the same total capacitance C. As can be seen from eqn. (1), increasing the qubit pitch $P_q$ 116 of FIG. 1A by a factor of 4 increases the size of the area of enclosed region 110 of FIG. 1A by a factor of approximately 16 where the enclosed region 110 of FIG. 1A may define the control footprint area.

Figure 2B:
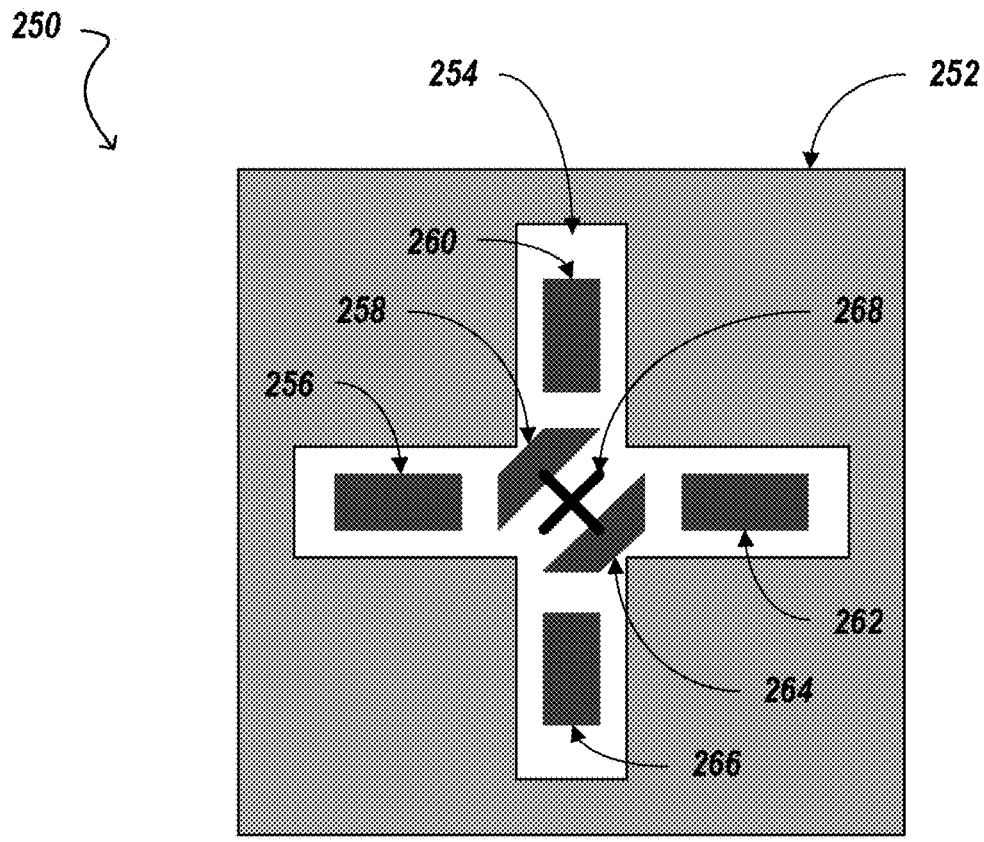
FIG. 2B shows two schematics that illustrate an example qubit design with six superconductor islands for an increased control footprint area.
Figure 2B:
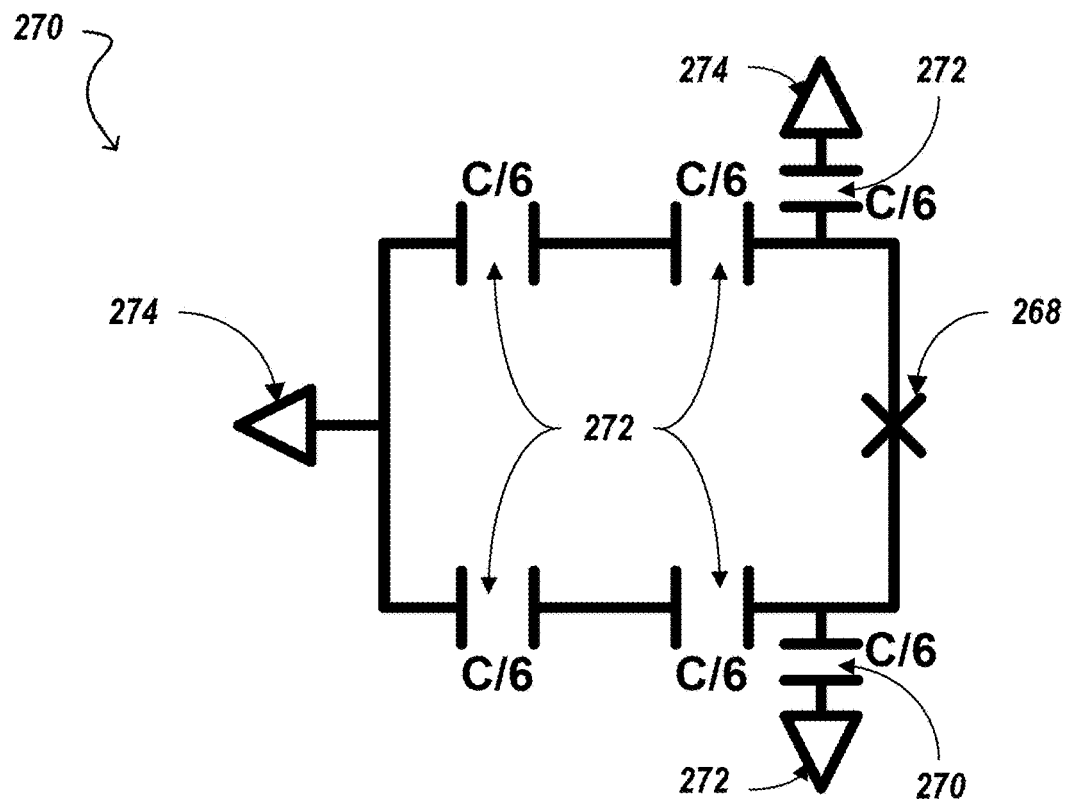

FIG. 2B shows two schematics 250, 270 that illustrate an example qubit design with six superconductor islands for an increased control footprint area. In particular, a qubit according to qubit design shown in FIG. 2B has more than two superconductor islands. Schematic 250 shows a substrate 252 that may be part of a chip that a qubit is positioned on, e.g. first chip 102 of FIG. 1A. Further, schematic 250 shows six superconductor islands 256, 258, 260, 262, 264, and 266, a Josephson junction 268 between superconductor islands 258 and 264 that together form a qubit. Gaps 254 are formed between the superconductor islands and a superconductor ground plane 252.

Schematic 270 shows a circuit diagram corresponding to the qubit design shown in schematic 250. The circuit diagram includes Josephson junction 268, three shorts 274 to ground, and six capacitors 272. Each of the capacitors 272 corresponds to a capacitor formed by each of the six superconducting islands 256, 258, 260, 262, 264, and 266. Each of the capacitors 272 has capacitance C/6 where C is the capacitance of the single superconductor island qubit design described with reference to FIG. 2A. The total capacitance of the circuit corresponding to the qubit design shown in FIG. 2B is C/36. Therefore, using a qubit design such as the one shown in FIG. 2B to form a qubit array such as the qubit array 128 shown with respect to FIG. 1A allows to increase the qubit pitch $P_q$ 116 of FIG. 1A by a factor of 36 whilst obtaining the same total capacitance C. As can be seen from eqn. (1), increasing the qubit pitch $P_q$ 116 of FIG. 1A by a factor of 36 increases the size of the area $A_c$ of enclosed region 110 of FIG. 1A by a factor of approximately 1296 where the enclosed region 110 of FIG. 1A may define the control footprint area.

Implementations of the subject matter and operations described in this specification can be implemented in digital electronic circuitry, analog electronic circuitry, suitable quantum circuitry or, more generally, quantum computational systems, in tangibly-embodied software or firmware, in computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

Quantum circuit elements (also referred to as quantum computing circuit elements) include circuit elements for performing quantum processing operations. That is, the quantum circuit elements are configured to make use of quantum-mechanical phenomena, such as superposition and entanglement, to perform operations on data in a non-deterministic manner. Certain quantum circuit elements, such as qubits, can be configured to represent and operate on information in more than one state simultaneously. Examples of superconducting quantum circuit elements include circuit elements such as quantum LC oscillators, qubits (e.g., flux qubits, phase qubits, or charge qubits), and superconducting quantum interference devices (SQUIDs) (e.g., RF-SQUID or DC-SQUID), among others.

In contrast, classical circuit elements generally process data in a deterministic manner. Classical circuit elements can be configured to collectively carry out instructions of a computer program by performing basic arithmetical, logical, and/or input/output operations on data, in which the data is represented in analog or digital form. In some implementations, classical circuit elements can be used to transmit data to and/or receive data from the quantum circuit elements through electrical or electromagnetic connections. Examples of classical circuit elements include circuit elements based on CMOS circuitry, rapid single flux quantum (RSFQ) devices, reciprocal quantum logic (RQL) devices and ERSFQ devices, which are an energy-efficient version of RSFQ that does not use bias resistors.

In certain cases, some or all of the quantum and/or classical circuit elements may be implemented using, e.g., superconducting quantum and/or classical circuit elements. Fabrication of the superconducting circuit elements can entail the deposition of one or more materials, such as superconductors, dielectrics and/or metals. Depending on the selected material, these materials can be deposited using deposition processes such as chemical vapor deposition, physical vapor deposition (e.g., evaporation or sputtering), or epitaxial techniques, among other deposition processes. Processes for fabricating circuit elements described herein can entail the removal of one or more materials from a device during fabrication. Depending on the material to be removed, the removal process can include, e.g., wet etching techniques, dry etching techniques, or lift-off processes. The materials forming the circuit elements described herein can be patterned using known lithographic techniques (e.g., photolithography or e-beam lithography).

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties. A superconductor (alternatively superconducting) material can be understood as material that exhibits superconducting properties at or below a superconducting critical temperature. Examples of superconducting material include aluminum (superconductive critical temperature of 1.2 kelvin) and niobium (superconducting critical temperature of 9.3 kelvin). Accordingly, superconducting structures, such as superconducting traces and superconducting ground planes, are formed from material that exhibits superconducting properties at or below a superconducting critical temperature.

In certain implementations, control signals for the quantum circuit elements (e.g., qubits and qubit couplers) may be provided using classical circuit elements that are electrically and/or electromagnetically coupled to the quantum circuit elements. The control signals may be provided in digital and/or analog form.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A device comprising:
   a plurality of quantum computing elements, wherein each quantum computing element of the plurality of quantum computing elements comprises at least three electrically conductive islands,
   wherein the plurality of quantum computing elements together define an enclosed region, and
   wherein, for each quantum computing element of the plurality of quantum computing elements, at least one electrically conductive island of the quantum computing element lacks a direct electrical connection to each other electrically conductive island of the quantum computing element.

2. The device of claim 1, wherein each quantum computing element of the plurality of quantum computing elements is arranged so as to couple to a respective adjacent quantum computing element of the plurality of quantum computing elements.

3. The device of claim 2, wherein each quantum computing element of the plurality of quantum computing elements is arranged so as to directly couple to a respective adjacent quantum computing element of the plurality of quantum computing elements.

4. The device of claim 1, further comprising a quantum computing control element, wherein the quantum computing control element is configured to provide a control signal to one or more of the quantum computing elements, and wherein the quantum computing control element is positioned within or overlapping the enclosed region.

5. The device of claim 4, wherein the quantum computing control element does not cover an area larger than an area of the enclosed region.

6. The device of claim 4, wherein the plurality of quantum computing elements are on a surface of a first substrate, and the quantum computing control element is on a surface of a second substrate, and the surface of the first substrate faces the surface of the second substrate.

7. The device of claim 4, wherein the quantum computing control element comprises a qubit control element.

8. The device of claim 7, wherein the qubit control element comprises a qubit XY control element or a qubit Z control element.

9. The device of claim 1, wherein the plurality of quantum computing elements is arranged in a two-dimensional array.

10. The device of claim 9, wherein the two-dimensional array is a two-by-two array of quantum computing elements, and the enclosed region is an area encircled by the two-by-two array of quantum computing elements.

11. The device of claim 1, wherein each quantum computing element of the plurality of quantum computing elements is a qubit.

12. The device of claim 1, wherein each electrically conductive island comprises a superconductor.

13. The device of claim 1, wherein for a first quantum computing element of the plurality of quantum computing elements, a first electrically conductive island of the quantum computing element is directly electrically connected to a second electrically conductive island of the quantum computing element.

14. The device of claim 1, wherein for a first quantum computing element of the plurality of quantum computing elements, a first electrically conductive island of the quantum computing element is coupled to a second electrically conductive island of the quantum computing element through a Josephson junction.

15. The device of claim 1, wherein a first quantum computing element of the plurality of quantum computing elements has a cross-shape.

16. The device of claim 1, wherein for a first quantum computing element of the plurality of quantum computing elements, a first electrically conductive island has a different size than a second electrically conductive island.

17. The device of claim 1, wherein for a first quantum computing element of the plurality of quantum computing elements, a first electrically conductive island has a same size as a second electrically conductive island.

18. The device of claim 1, wherein the enclosed region is unoccupied by qubits and qubit control elements.

19. The device of claim 1, wherein an area, Ac, of the enclosed region is defined as $Ac=(Pq-Wq)^2$, wherein Wq is a qubit width, and Pq is a qubit pitch.

20. A device comprising:

a plurality of quantum computing elements, wherein each quantum computing element of the plurality of quantum computing elements comprises at least two electrically conductive islands; and a quantum computing control element wherein the plurality of quantum computing elements together define an enclosed region, and wherein, for each quantum computing element of the plurality of quantum computing elements, a first electrically conductive island of the quantum computing element is electrically connected to a second electrically conductive island of the quantum computing element through a Josephson junction, wherein each quantum computing element of the plurality of quantum computing elements is arranged so as to directly electromagnetically couple to a respective adjacent quantum computing element of the plurality of quantum computing elements, wherein the quantum computing control element is configured to provide a control signal to one or more of the quantum computing elements, and wherein the quantum computing control element is positioned within or overlapping the enclosed region.

* * * * *